April 21, 1970 T. TARENSKEEN 3,507,129
DRIVE MEANS
Filed Feb. 28, 1969 3 Sheets-Sheet 1

INVENTOR.
THEODORE TARENSKEEN
By
Attorney

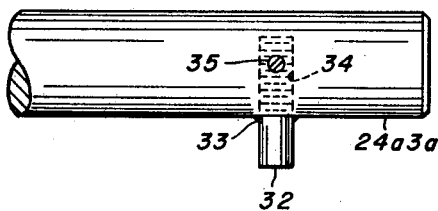
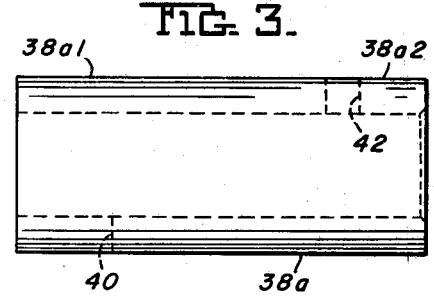
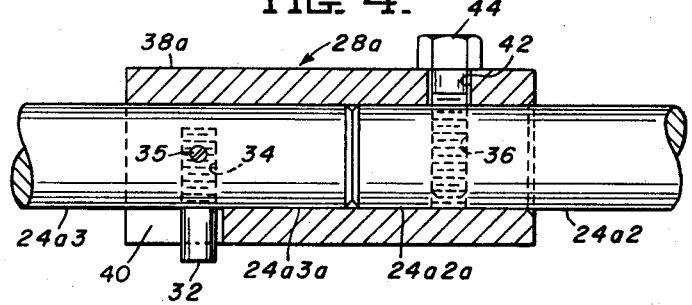
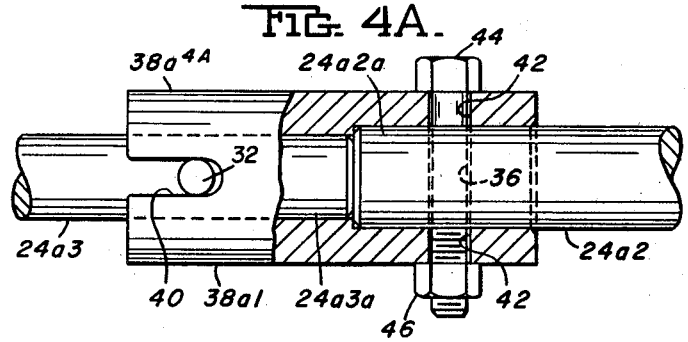
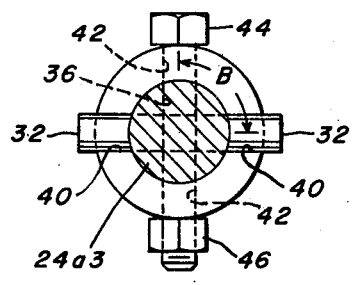
INVENTOR.
THEODORE TARENSKEEN
Attorney

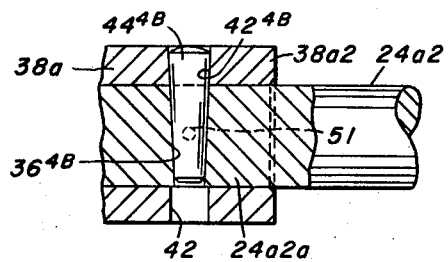
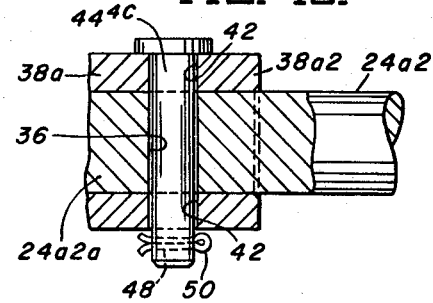
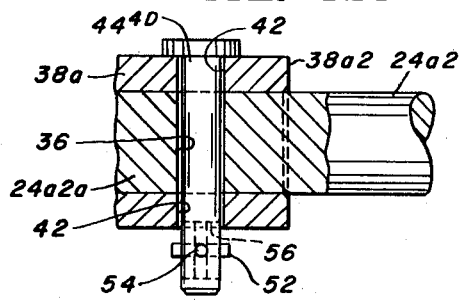
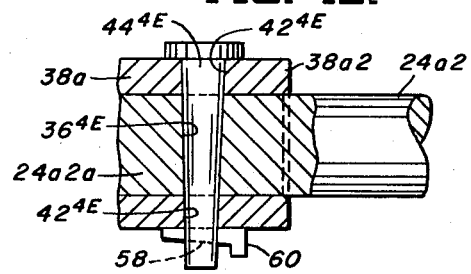
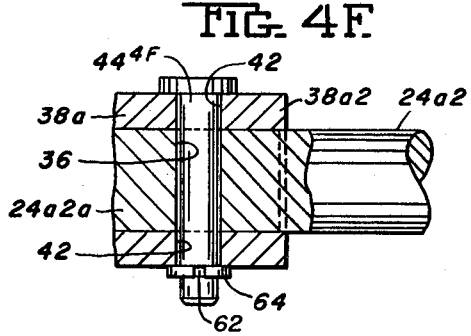
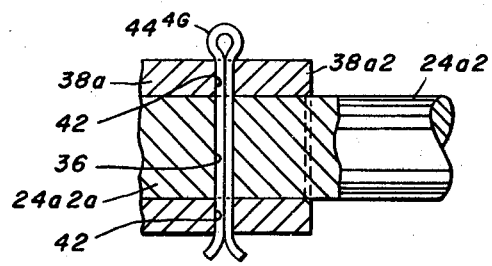
INVENTOR.
THEODORE TARENSKEEN
Attorney United States Patent Office 3,507,129
Patented Apr. 21, 1970

3,507,129
DRIVE MEANS
Theodore Tarenskeen, Oakmont, Pa., assignor to United States Steel Corporation, a corporation of Delaware
Continuation-in-part of application Ser. No. 693,217, Dec. 26, 1967. This application Feb. 28, 1969, Ser. No. 803,266
Int. Cl. F16c 1/02
U.S. Cl. 64—1        21 Claims

ABSTRACT OF THE DISCLOSURE

A drive means for positioning one end of a shaft member in a predetermined location a predetermined distance from a reference centerline. The drive means has a frame, a slidable member reciprocable in the frame, positioning means engageable with the slidable member for positioning one end in the predetermined location, a first gear box means disposed in spaced relation to the positioning means, a first connecting member connected to the positioning means, a second connecting member connected to the first gear box means, a quick disconnect coupling device for connecting the first connecting member to the second connecting member, and motor means connected to the first gear box means for driving the first gear box means.

BACKGROUND OF THE INVENTION

This application is a continuation-in-part of U.S. patent application Ser. No. 693,217, filed Dec. 26, 1967 by applicant and assigned to the same assignee as the present application, and now abandoned.

A seamless pipe mill piercer that utilized three piercer rolls rather than the conventional two piercer rolls has been developed. In order to produce concentric shells or pipes the three piercer rolls must be continuously aligned so that the distance from the centerline of the piercer roll pass to the longitudinal axis of each of the three piercer rolls is identical. This piercer roll pass opening is adjusted uniformly and rapidly by a common drive system which moves the three piercer rolls simultaneously. For the purpose of individually aligning a particular piercer roll without effecting the alignment of the other two piercer rolls, the other two piercer rolls are disconnected from the drive system. This conventional alignment procedure requires about one hour during which time the production of seamless pipe is lost.

Conventional coupling devices are shown in the following patents:

U.S. Patents Nos. 700,369, Pixley, May 20, 1902; 1,387,043, DeVoe, Aug. 9, 1921; 2,430,683, O'Malley, Nov. 11, 1947; 2,471,974, O'Malley, May 31, 1949; and 3,098,365, Pearson, July 23, 1963.

OBJECTS OF THE INVENTION

It is the general object of this invention to avoid and overcome the foregoing and other difficulties of and objections to prior art practices by the provision of an improved drive means which:

(1) Is simple and rugged in construction;
(2) Has a long operational life with a minimum of maintenance;
(3) Provides a quick disconnect between adjacent coupled shaft members; and
(4) Reduces appreciably the down-time of the associated machinery.

BRIEF SUMMARY OF THE INVENTION

The aforesaid objects of this invention, and other objects which will become apparent as the description proceeds, are achieved by providing a drive means for positioning one end of a shaft member in a predetermined location a predetermined distance from a reference. The drive means has a frame, a slidable member reciprocable in the frame, positioning means engageable with the slidable member for positioning the one end in the predetermined location, a first gear box means disposed in spaced relation to the positioning means, a first connecting member connected to the positioning means, a second connecting member connected to the first gear box means, a quick disconnect coupling device for connecting the first connecting member to the second connecting member and motor means connected to the first gear box means for driving the first gear box means.

Although the principles of this invention are broadly applicable to drive means, this invention is particularly adapted for use in conjunction with a drive means for positioning a piercer roll of a seamless pipe mill and hence it has been so illustrated and will be so described.

BRIEF DESCRIPTION OF THE SEVERAL VIEWS OF THE DRAWINGS

For a better understanding of this invention reference should be had to the accompanying drawings, wherein like numerals of reference indicate similar parts throughout the several views and wherein:

FIGURE 2 is an enlarged side elevational view of the connecting end of a first shaft member which is to be coupled by the coupling device;

FIGURE 3 is an enlarged side view of the coupling sleeve or sleeve member of the coupling device;

FIGURE 4 is an enlarged fragmentary side elevational view of the first shaft member and the second shaft member coupled by the coupling sleeve but with the first aperture and second aperture rotated 90° from their normal position;

FIGURE 4A is a view similar to FIGURE 4 of an alternative embodiment of the coupling device;

FIGURES 4B–4G are fragmentary side elevational views of alternative embodiments of fasteners; and FIGURE 5 is an end elevational view taken from the left-hand side of FIGURE 4A.

DETAILED DESCRIPTION

Figure 1:
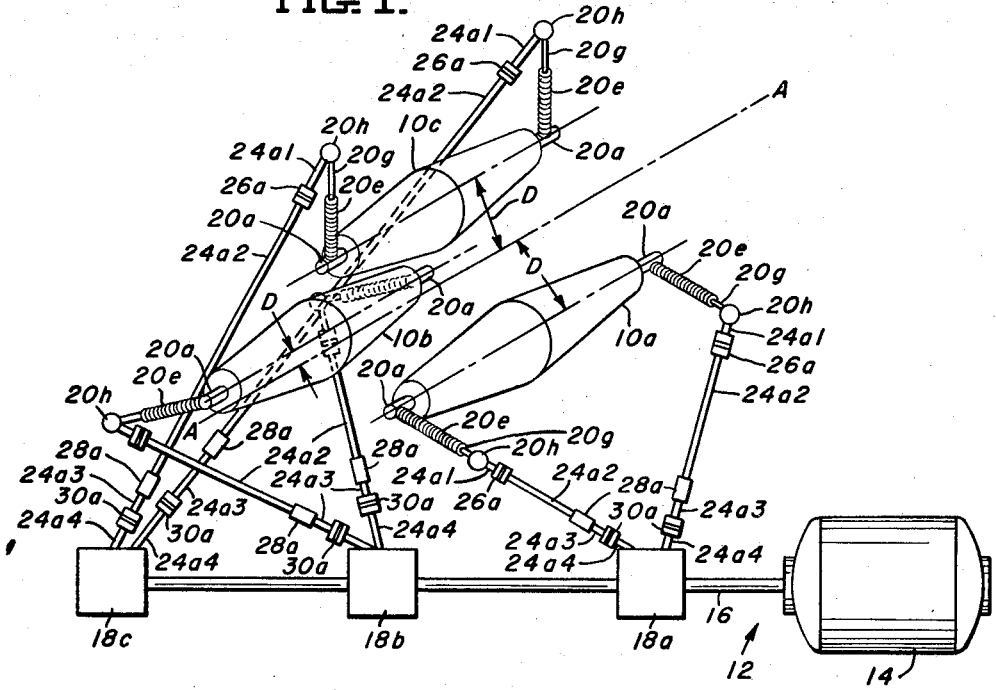
FIGURE 1 is a schematic perspective view of the drive means for positioning the piercer rolls of a seamless pipe mill and showing the coupling device.

With specific reference to the form of this invention illustrated in the drawings, and referring particularly to FIGURE 1, a drive means for positioning or aligning the piercer rolls 10a, 10b, 10c a predetermined distance D from the centerline A—A of a pass is indicated generally by the reference numeral 12. The piercer rolls 10a, 10b, 10c are part of a pipe mill of the type shown in U.S. Patent 651,714, issued June 12, 1900.

This drive means 12 has a motor 14 (FIGURES 1, 1A) which drives through its shaft 16 a plurality, for example, of three bevel type gear boxes 18a, 18b, 18c. Each gear box 18a, 18b, 18c is similarly connected to its associated piercer roll 10a, 10b, 10c respectively by a linkage which will now be described for illustrative purposes with respect to the gear box 18a and piercer roll 10a.

Figure 1A:
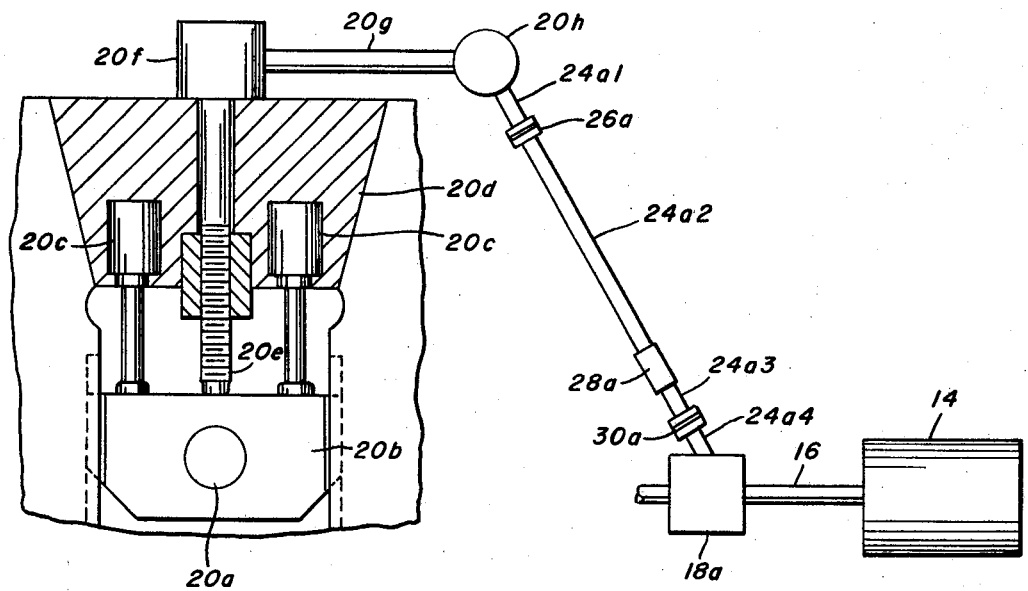
FIGURE 1A is an enlarged fragmentary schematic view of the couplings, connecting rod sections, gear train, adjustment screw, frame, floating bearing, roll shaft and hydraulic cylinders for positioning one of the roll shafts.

As shown in FIGURE 1A each end of the roll shaft 20a is mounted in a slidable bearing 20b supported by hydraulic cylinders 20c in a frame 20d. A power screw 20e is rotatable in the frame 20d by a worm-type gear box 20f connected by a connecting rod 20g and a bevel-type gear box 20h to a sectioned connecting rod having the sections 24a1, 24a2, 24a3, 24a4. The sections 24a1 the 24a2 are connected together by a flexible coupling 26a; the sections 24a2 and 24a3 by a quick disconnect coupling 28a; and the sections 24a3, 24a4 by a flexible coupling 30a. The section 24a4 is connected to the gear box 18a.

COUPLING DEVICE 28a

This coupling device 28a (FIGURES 1, 1A, 4) is employed for connecting a first shaft member, such as the section 24a2, having a first end portion 24a2a (FIGURE 4) and a second shaft member, such as the section 24a3, having a second end portion 24a3a (FIGURES 2, 4). As shown in FIGURES 2, 4, the section 24a3 has a stud 32 projecting from a hole 34 in one side of the second end portion 24a3a. The stud 32 is secured to the second end portion 24a3a by welding at 33 (FIGURE 2) or by threading into the threaded hole 34 and retaining therein by a set screw 35. It will be understood that for purposes of compact illustration that the above-mentioned securing means for the stud 32 are shown in the single figure, namely, FIGURE 2.

As shown in FIGURE 4 the section 24a2 is provided with a first aperture, a hole 36, in the first end portion 24a2a. The hole 36 may be threaded, as shown in FIGURE 4, or unthreaded, FIGURE 4A.

So that a sleeve member 38a (FIGURES 3, 4) rotates with the section 24a3, the sleeve member 38a is provided with a longitudinal slot 40 at one end 38a1 (the left-hand end, FIGURE 3), which slot 40 is adapted to receive the stud 32. The sleeve member 38a is provided at the other end 38a2 (the right end, FIGURE 3) with a second aperture, a hole 42, adapted to register with the hole 36 in the first end portion 24a2a when the stud 32 is in engagement with the slot 40. Alternatively the hole 42 may be threaded and the hole 36 unthreaded. The registering holes 36, 42 are disposed at an angle B (FIGURE 5) with respect to the plane formed by the centerline of the slot 40 and the axis of the sleeve member 38. The angle B may be any angle of about 0–180° but in this embodiment of FIGURES 2–4, B is desirably about 180°. In order for the sleeve member 38 and the section 24a2 to rotate together, a fastener, such as the bolt 44 (FIGURE 4), threads into the hole 36.

OPERATION

In order to disconnect the sleeve member 38a from the sections 24a2 and 24a3, the bolt 44 (FIGURE 4) is unthreaded and removed from the threaded hole 36 in the section 24a2a and the section 24a2 is withdrawn from the end 38a2 of the sleeve member 38a. Thereafter the sleeve member 38a is moved to the right, as viewed in FIGURE 4, so that the stud 32 clears the longitudinal slot 40.

Conversely, the coupling device 28a (FIGURE 4) is assembled by sliding the sleeve member 38a onto the end portion 24a3a of the section 24a3 so that the longitudinal slot 40 engages the stud 32. The end portion 24a2a of the section 24a2 is then inserted into the end 38a2 of the sleeve member 38a in abutting engagement with the end portion 24a3a so that the hole 42 in the sleeve member 38a and the threaded hole 36 in the end portion 24a2a are in registry. The bolt 44 is threaded into the hole 36 to secure the end portion 24a2a to the sleeve member 38a.

ALTERNATIVE EMBODIMENTS

It will be understood by those skilled in the art that alternatively, as shown in FIGURES 4A, 5, the sleeve member $38a^{4A}$ is provided with two diametrically opposed holes 42; the bolt 44 extends through the unthreaded holes 42 in the sleeve member $38a^{4A}$ and the unthreaded hole 36 in the first end portion 24a2a and is secured therein by a nut 46. The sleeve member 38a has two diametrically opposed slots 40 in the end 38a1 and the stud 32 projects from both sides of the section 24a3, and extends into both slots 40. The angle B in this case is about 90°. Alternatively the nut 46 may be eliminated and one or more of the holes 42 and the hole 36 may be threaded. In addition the section 24a3 may have a smaller diameter (FIGURE 4) or a larger diameter (not shown) than the section 24a2 and the sleeve member $38a^{4A}$ may be adapted to accommodate shaft members having other cross sectional shapes such as hexagonal, octagonal and the like. Alternatively the left-hand stud 32 (FIGURE 5) may be disposed at an angle, such as B° (FIGURE 5) with respect to the right-hand stud 32. The angle B may vary in the range of about 0°–180°.

In FIGURE 4B a tapered pin $44^{4B}$ is driven into tapered holes $36^{4B}$, $42^{4B}$ in the end portion 24a2a of the section 24a2 and the sleeve 38a respectively and retained therein by a set screw 51. Such tapered pin $44^{4B}$ is removed by a punch (not shown) inserted in the lower hole 42 (FIGURE 4B) in the sleeve member 38a.

FIGURE 4C shows the fastener as a pin $44^{4C}$ provided with a cotter pin hole 48 and retained in the holes 42, 36 by a cotter pin 50.

As shown in FIGURE 4D, a key pin $44^{4D}$ has a key 52 pivoted at 54 in a slot 56 in the key pin $44^{4D}$. When the key 52 is in the vertical dotted line position (FIGURE 4D), the pin $44^{4D}$ may be removed.

Referring to FIGURE 4E, a tapered pin $44^{4E}$ has a wedge slot 58 into which a wedge 60 is driven to secure the tapered pin $44^{4E}$ in the holes $42^{4E}$, $36^{4E}$.

In FIGURE 4F the pin $44^{4F}$ has a ring retaining annular recess 62 and a retaining ring 64 therein.

As shown in FIGURE 4G, the fastener is a cotter pin $44^{4G}$ for use with light shaft members 24a2, 24a3 and low torque.

It will be understood that alternatively the set screw 35 (FIGURE 2) for securing the stud 32 in the section 24a3 may be replaced by a tapered pin similar to tapered pin $44^{4B}$ (FIGURE 4B), or a wedge similar to the wedge 60 (FIGURE 4E), or a retaining ring similar to the ring 64 (FIGURE 4F). Further, the stud 32 (FIGURE 2) may have a tapered shank similar to the pin $44^{4B}$ (FIGURE 4B).

SUMMARY OF THE ACHIEVEMENT OF THE OBJECTS OF THE INVENTION

It will be recognized by those skilled in the art that the objects of this invention have been achieved by providing an improved drive means (FIGURES 1–5, 4A–4G) which is simple and rugged in construction, has a long operational life with a minimum of maintenance, provides a quick disconnect between adjacent coupled shaft members 24a2, 24a3 and reduces appreciably the down-time of the associated machinery.

While in accordance with the patent statutes preferred and alternative embodiments of this invention have been illustrated and described in detail, it is to be particularly understood that the invention is not limited thereto or thereby.

I claim:
1. A drive means for positioning one end of a shaft member in a predetermined location a predetermined distance from a reference centerline, said drive means having:
  (a) a frame,
  (b) a slidable member reciprocable in said frame,
  (c) positioning means engageable with said slidable member for positioning said one end in said predetermined location,
  (d) a first gear box means disposed in spaced relation to said positioning means,
  (e) a first connecting member connected to said positioning means,
  (f) a second connecting member connected to said first gear box means, and having a first section and a second section,
  (g) a quick disconnect coupling device for connecting said first section to said second section,

(h) a second gear box means for connecting said first connecting member to said first section, and (i) motor means connected to said first gear box means for driving said first gear box means.

2. The drive means recited in claim 1 wherein said positioning means has a screw means and a third gear box means connected to said screw means and to said first connecting member.

3. The drive means recited in claim 1 wherein said second connecting member has a third section adjacent said first section and a first flexible coupling for connecting said third section to said first section.

4. The drive means recited in claim 1 and wherein said second connecting member has a fourth section adjacent said second section and a second flexible coupling for connecting said second section to said fourth section.

5. The drive means recited in claim 1 and having supporting means on said frame and connected to said slidable member.

6. The drive means recited in claim 1 wherein said quick disconnect coupling device has:

(1) said first section provided with a first aperture in a first end portion.

(2) said second section having a stud projecting from one side of a second end portion thereof, (3) a sleeve member provided at one end with a longitudinal slot adapted to receive said stud so that said sleeve member and said second section rotate together, (a) said sleeve member being provided at the other end with a second aperture adapted to register with said first aperture, and (4) a fastener adapted to be secured in said first aperture and said second aperture so that said sleeve member and said first section rotate together.

7. The drive means recited in claim 6 wherein said stud projects from the other side of said second end portion and said sleeve member has a second longitudinal slot adapted to receive said stud.

8. The drive means recited in claim 6 wherein said sleeve member has a third aperture adapted to register with said first aperture.

9. The drive means recited in claim 6 wherein said second aperture is threaded and said fastener is a threaded fastener.

10. The drive means recited in claim 6 wherein said first aperture is threaded and said fastener is a threaded fastener.

11. The drive means recited in claim 6 wherein said fastener is threaded and having a nut threaded on said fastener.

12. The drive means recited in claim 6 wherein said fastener is a tapered pin.

13. The drive means recited in claim 6 wherein said fastener is a key pin.

14. The drive means recited in claim 6 wherein said fastener is a pin provided with a cotter pin hole and having a cotter pin in said cotter pin hole to secure said pin in said first aperture and said second aperture.

15. The drive means recited in claim 6 wherein said fastener is a tapered pin and is provided with a wedge slot and having a wedge in said wedge slot.

16. The drive means recited in claim 6 wherein said fastener is a pin provided with a ring retaining annular recess and having a retaining ring in said recess.

17. The drive means recited in claim 6 wherein said fastener is a cotter pin.

18. The drive means recited in claim 6 wherein said stud is welded to said second section.

19. The drive means recited in claim 6 wherein said stud is threaded into said second section.

20. The drive means recited in claim 6 wherein said stud is secured in said second section by a set screw.

21. The drive means recited in claim 6 wherein said stud is secured in said second section by a tapered pin.

References Cited

UNITED STATES PATENTS

| | | | |
|---|---|---|---|
| 1,241,100 | 9/1917 | Eden | 64—1 |
| 1,409,626 | 3/1922 | Walther | 85—3 |
| 1,528,433 | 3/1925 | Kay | 64—6 X |
| 2,402,693 | 6/1946 | Summerbell | 85—8.8 |
| 3,335,631 | 8/1967 | Heeren | 85—3 |

FRED C. MATTERN, Jr., Primary Examiner

M. A. ANTONAKAS, Assistant Examiner

U.S. Cl. X.R.

64—6; 85—3

UNITED STATES PATENT OFFICE
CERTIFICATE OF CORRECTION

Patent No. 3,507,129 April 21, 1970

Theodore Tarenskeen

It is certified that error appears in the above identified patent and that said Letters Patent are hereby corrected as shown below:

Column 2, line 3, after "reference" insert -- centerline --.
Column 3, line 39, after "angle" insert -- in the range --.

Signed and sealed this 5th day of January 1971.

(SEAL)
Attest:

Edward M. Fletcher, Jr.  
Attesting Officer

WILLIAM E. SCHUYLER, JR.  
Commissioner of Patents